D. STEWART.
Plow Clevis.
No. 82,764. Patented Oct. 6, 1868.
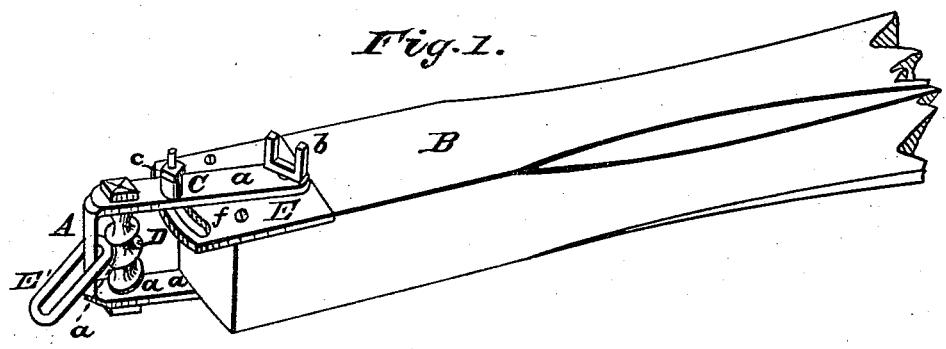
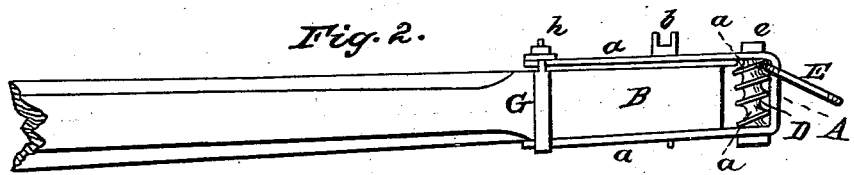
Witnesses:
Geo. E. Green
D. P. Wright
Inventor:
David Stewart
per
J. B. Woodruff & Son
Attorneys.

United States Patent Office.

DAVID STEWART, OF CORINNA, MAINE.

Letters Patent No. 82,764, dated October 6, 1868.

IMPROVEMENT IN CLEVIS FOR PLOWS.

*The Schedule referred to in these Letters Patent and making part of the same.*

TO ALL WHOM IT MAY CONCERN:

Be it known that I, DAVID STEWART, of Corinna, in the county of Penobscot, and State of Maine, have invented a certain new and useful Improvement in a Clevis for Plows and for other purposes; and the following is a full, clear, and exact description of the same, reference being had to the accompanying drawings, making a part of this specification, in which—

Figure 1 represents a perspective view of my improvement in clevises, as attached to a plow-beam—a broken-off section.

Figure 2 shows a side view of beam and a clevis, with a stirrup for adjusting the side draught of the plow.

The object of my invention is to adjust the depth of the draught of a plow, and also the side draught, to the greatest nicety, in the easiest and most efficient manner.

My invention consists in combining with a spiral shaft and link, in a clevis, for adjusting the depth of a plow, a metal plate, with a circular slot, clamp, bolt, and nut, or its equivalent, for adjusting the side draught.

To enable others to make and use my improved clevis, I will describe it more fully, referring to the drawings, and to the letters marked thereon.

I take a flat bar of iron or steel, of sufficient width and thickness to make the clevis, forge the central portion into a round bar, A, about the length of the thickness of the plow-beam B, then turn the flat ends $a\ a$, having previously punched them, to receive the wrench-bolt, $b$, and clamp-bolt $c$, so that the flat bars $a\ a$ will be parallel, and pass easily on to the end of the beam B. Between the flat bars $a\ a$, I place, near the vertical round bar A, a spiral stud or shaft, D, the thread or worm being sufficiently wide apart to leave an opening between it and the bar A to receive a ring or link, E, to which the draught-chain is attached, for plowing, &c., the link E being held by the thread $d\ d$ on the spiral shaft D, so as to retain it in any place on the bar A, from moving up or down, the spiral shaft D being provided with journals, so as to turn in the clevis, and change the position of the link E from the top to the bottom, and also a set-nut, $e$, to hold it firmly fixed in any position.

On the top of the beam B, I secure a plate of metal, F, it having a circular slot, $f$, having for its centre the bolt $b$, which plate projects over the front end of the beam B a sufficient distance to admit of a clamp-bolt, C, and nut $c$, by which the side draught of the plow may be adjusted to a great nicety.

Another mode of adjusting the side draught is shown in fig. 2, by having the flat bars $a\ a$ of the clevis extend back of the bolt $b$, on the beam B, and having a stirrup, G, around the beam, and a clamp-plate and nuts, $h$, to secure it when placed in any desired position, to effect the side draught. When the clevis is constructed and secured in this manner, the slotted plate F and clamp-bolt may be dispensed with.

What I claim as my invention, and desired to secure by Letters Patent, is—

In combination with the spiral shaft D and link E, the slotted plate F, clamp-bolt C, and nut on the stirrup G, for adjusting the side draught, as herein set forth.

In testimony whereof, I hereunto subscribe my name in the presence of—

DAVID STEWART.

Witnesses:
VOLNEY A. SPRAGUE,
C. H. MORSE.